UNITED STATES PATENT OFFICE 2,299,135

PRINTING INK

Donald Robert Erickson and Paul J. Thoma, Kalamazoo, Mich., assignors to Michigan Research Laboratories, Inc., Kalamazoo, Mich.

No Drawing. Application June 4, 1942, Serial No. 445,803

2 Claims. (Cl. 260—30)

This invention relates to improvements in printing inks.

This application is a continuation in part of our application Serial No. 396,294, filed June 2, 1941, for Printing ink.

This invention relates to printing inks and particularly to those in which a binder is employed with a solvent to form a varnish in which a pigment is incorporated. The binder is soluble in the solvent and in the solvent with a limited quantity of water but is not soluble in the solvent with an unlimited quantity of water. Such inks are particularly desirable because they have high water tolerance because the binder is soluble in the solvent and a limited quantity of water and will therefore not set up on a printing press, even when high humidities are encountered. These inks may, however, after printing be treated with water, for example in the form of steam or a fine spray so that the binder at the surface of a printed film will separate from the solvent because of the presence of more than a limited quantity of water in the solvent and will thus form a thin hard film of the binder over the printed film to thereby prevent offset. Such inks are useful also in cases where it is not desired to use the water to prevent offset.

The objects of this invention are:

First, to provide a new and improved printing ink.

Second, the provide such a printing ink having a high melting point binder with a hard surface and gloss.

Third, to provide such a printing ink which has water tolerance and will not set up on the press in the presence of high atmospheric humidities.

Fourth, to provide such an ink which can be treated with water after printing to prevent offset and which will set up very quickly when it is so treated.

Fifth, to provide such an ink in which phenolic resins are incorporated with a liquid polyglycol as a solvent.

Further objects and advantages pertaining to details and economies will appear from the description to follow.

In our improved printing ink, we use a liquid polyglycol such as diethylene glycol as the solvent for the varnish. We prefer to use 50% of the weight of the varnish of this liquid polyglycol.

With the liquid polyglycol, we incorporate a resin of the phenolic type which consists of a phenol formaldehyde condensation product which has been modified with rosin. The rosin modification must be such as to make the resin soluble in ethyl alcohol, and in the liquid polyglycol used as a solvent in the varnish. The resin has a high acid number of 125 or more. It is a solid resin. We prefer to use 10% of the weight of the varnish of this phenolic resin.

With this phenolic resin, we employ either a resin comprising rosin modified with an alpha beta unsaturated organic polybasic acid such as maleic or fumaric or a terpene hydrocarbon of the formula $C_{10}H_{16}$ modified with an alpha beta unsaturated organic polybasic acid such as maleic and fumaric or a combination of said resins. These resins which are employed are solid and are soluble in the liquid polyglycol such as diethylene glycol. We prefer to use 40% by weight of the varnish of such resins or a mixture thereof. The terpene hydrocarbons which are suitable when modified as above described are alpha terpinene, beta terpinene, pinene, alpha pinene, beta pinene, dipentene, limonene, or terpinolene.

We have found that the phenolic resin above described is not soluble in cold diethylene glycol and if it is put into temporary solution in an anhydrous condition by the application of heat, it will separate on standing from the diethylene glycol or other liquid polyglycol. Such a solution has practically no water tolerance and the resin will immediately separate from any temporary solution if the temporary solution is exposed to normal humidity such as would be encountered in printing establishments.

We have found, however, that if such a phenolic resin is employed in combination with either the resin comprising rosin modified with an alpha beta unsaturated organic polybasic acid or terpene hydrocarbon of the formula $C_{10}H_{16}$ modified with an alpha beta unsaturated organic polybasic acid or a mixture of these resins, the ink will have water tolerance and will not set up on a press even when high humidity conditions are encountered in a printing establishment. The link is thus usable because it does not set up on the press and when it is treated with steam or water after printing, the film of binder will form over the surface of the printed film and thus prevent offset.

The ink has a hard surface and a gloss and it also has the property of setting up very quickly after it has been printed and when it is treated with water either by subjecting the printed film, for example, to steam or to a water spray.

The pigment employed may be selected from standard pigments. We prefer to use pigments insoluble in the polyglycol solvent and in water.

The terms and expressions which have been herein employed are used as terms of description and not of limitation and there is no intention in the use of such terms and expressions of excluding any equivalents of the features shown and described, or portions thereof. It is recognized that various modifications are possible within the scope of the invention claimed.

Having thus described our invention, what we claim as new and desire to secure by Letters Patent is:

1. A printing ink comprising a varnish stable against separation of the binder at high atmospheric humidity conditions comprising a solvent comprising a liquid polyglycol, a binder comprising a solid resin selected from the group consisting of rosin modified by an alpha beta unsaturated organic polybasic acid and a terpene hydrocarbon of the formula $C_{10}H_{16}$ modified by an alpha beta unsaturated organic polybasic acid, mixed with a solid alcohol soluble phenolic resin soluble in said solvent and comprising a phenol formaldehyde condensation product modified with rosin, and a pigment.

2. A printing ink comprising a varnish stable against separation of the binder at high atmospheric humidity conditions comprising a solvent comprising 50 parts by weight of a liquid polyglycol, a binder comprising 40 parts by weight of a solid resin selected from the group consisting of rosin modified by an alpha beta unsaturated organic polybasic acid and a terpene hydrocarbon of the formula $C_{10}H_{16}$ modified by an alpha beta unsaturated organic polybasic acid, mixed with 10 parts by weight of a solid alcohol soluble phenolic resin soluble in said solvent and comprising a phenol formaldehyde condensation product modified with rosin, and a pigment.

DONALD ROBERT ERICKSON.
PAUL J. THOMA.